United States Patent [19]
Lange

[11] 4,180,989
[45] Jan. 1, 1980

[54] UNIVERSAL JOINT CONSTRUCTION

[75] Inventor: Günther Lange, Damme, Fed. Rep. of Germany

[73] Assignee: Lemförder Metallwaren AG, Fed. Rep. of Germany

[21] Appl. No.: 883,591

[22] Filed: Mar. 6, 1978

[30] Foreign Application Priority Data

Jul. 27, 1977 [DE] Fed. Rep. of Germany ....... 2733772

[51] Int. Cl.² ............................................. F16D 3/26
[52] U.S. Cl. .................................. 64/17 R; 64/17 A; 64/4; 403/57; 403/302
[58] Field of Search ........................ 64/4, 17 R, 17 A; 403/302, 57, 58, 334, 312, 383, 266, 107

[56] References Cited

U.S. PATENT DOCUMENTS

| | | | |
|---|---|---|---|
| 2,040,002 | 5/1936 | Jones | 64/17 R |
| 2,302,882 | 11/1942 | Ohlendorf | 64/17 R |
| 2,310,011 | 2/1943 | Cave | 403/58 |
| 2,904,975 | 9/1959 | Miller | 64/17 A |
| 3,045,455 | 7/1962 | Potgieter | 64/17 R |
| 3,867,050 | 2/1975 | Pitner | 403/383 |
| 4,091,640 | 5/1978 | Olkowski | 64/17 R |

*Primary Examiner*—Charles J. Myhre
*Assistant Examiner*—R. C. Turner
*Attorney, Agent, or Firm*—McGlew and Tuttle

[57] ABSTRACT

A universal joint for interconnecting two rotatable shafts comprises a first fork assembly, first and second fork half members, each having a first end with a cylindrical hub portion and an opposite wider end having bounding side wall flanges which are adapted to engage over a hub nut which is engageable over one of the shafts, the half portions being assembled around the hub nut and the shaft and being clamped thereto and a similar assembly of third and fourth fork members which are connectable to the other shaft in a similar manner and which also includes a cross link which has a first set of diametrically opposite rotational pins rotatably supported with respect to cylindrical hub portions of the first and second fork half members, and a second set of rotation axis pins rotatably supported in respective cylindrical hub portions of the third and fourth fork half members, and wherein the construction includes half forks which are advantageously made of U-shape cross section and comprise thin stamped metal sheets.

9 Claims, 7 Drawing Figures

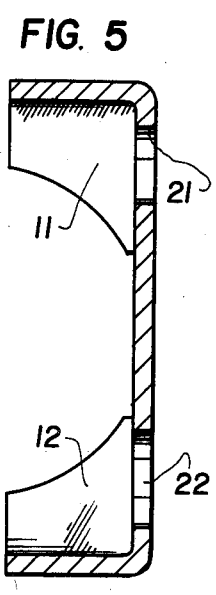
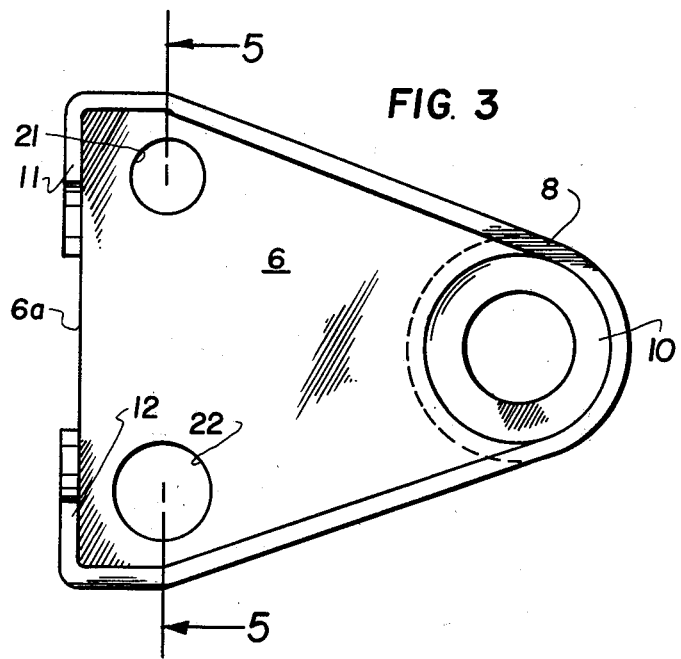
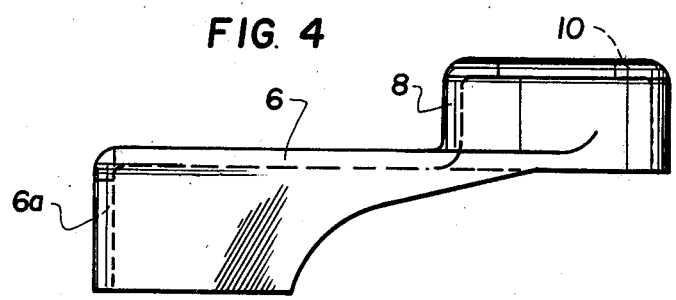

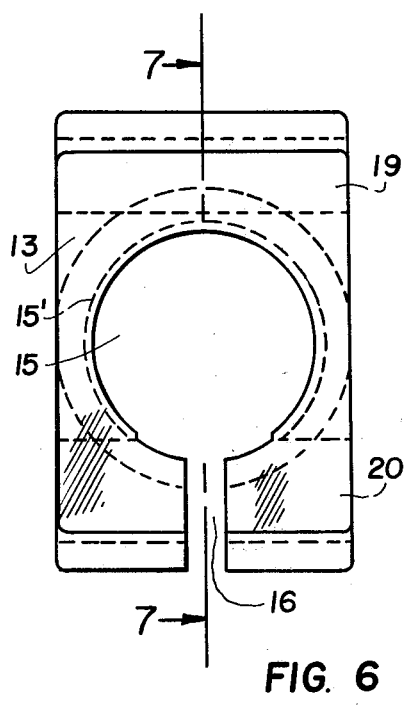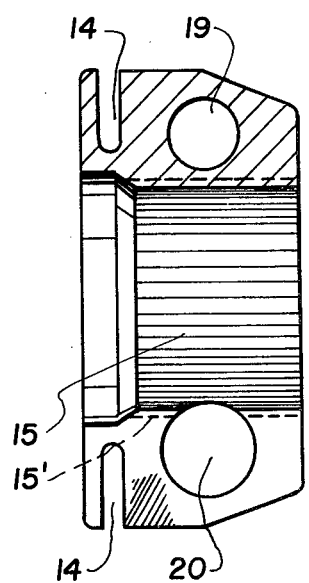
FIG. 6
FIG. 7

UNIVERSAL JOINT CONSTRUCTION

BACKGROUND OF THE INVENTION

1. Field of the Invention

The invention relates in general to universal joint construction and in particular to a new and useful universal joint for the steering mechanism of motor vehicles, in which the forks of the joint consist of two fork halves, stamped out of thin sheet metal, with cylindrical seats formed therein to seat the universal joint pins.

2. Description of the Prior Art

Universal joints with joint forks formed of two sheet metal stampings are known in various designs. But if relatively thin sheet metal is to be used to produce such forks in order to save material and weight and for reasons of production engineering, sufficient strength, particularly the bending strength required for the transmission of the acting steering forces is not assured. Also, the connection of the fork halves to each other and to the adjacent shaft ends is often very costly as to material and labor.

SUMMARY OF THE INVENTION

The invention provides a universal joint with joint forks which consist of two fork halves which can be produced from particularly thin sheet metal material, yet are of great strength despite their light weight. The fork halves are of simple design and can, therefore, be produced inexpensively. In addition, the connection of the universal joint to the driving and/or driven shaft is advantageously detachable and without backlash.

Various noteworthy advantages are achieved by the joint fork design according to the invention. Due to the use of a hub, cheaply producible as production line stamping, as the sole connecting element for the two fork cheeks it is possible to join all components forming part of the joint fork securely in assembly so as to be resistant also to higher stresses. Moreover, due to their design, the deep-drawn fork cheeks can be produced as brackets offering approximately the same resistance to bending.

Accordingly, it is an object of the invention to provide an universal joint for motor vehicle steering mechanisms in which the joint comprises joint forks each having two fork halves stamped out of thin sheet metal, including a first end with cylindrical seats formed therein to seat the pins of the cross link, and having opposite ends engageable over a portion of the associated shaft, and connected to another fork half member which has its opposite end over a portion of the associated shaft, wherein the shafts are positively combined into a unit so as to be form fitting around each shaft and are connected to cross bends which engage into respective ones of the cylindrical hub portion of the fork half members.

A further object of the invention is to provide a universal joint which is simple in design, rugged in construction, and economical to manufacture.

The various features of novelty which characterize the invention are pointed out with paticularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 3 is a top view of a fork half of the joint shown in FIG. 1;

FIG. 4 is a side view of the fork half shown in FIG. 3;

FIG. 5 is a section taken along the line 5—5 of FIG. 3;

FIG. 6 is a front view of a fork hub used in the universal joint shown in FIG. 1; and FIG. 7 is a section taken along the line 7—7 of FIG. 6.

GENERAL DESCRIPTION OF THE PREFERRED EMBODIMENTS

Figure 1:
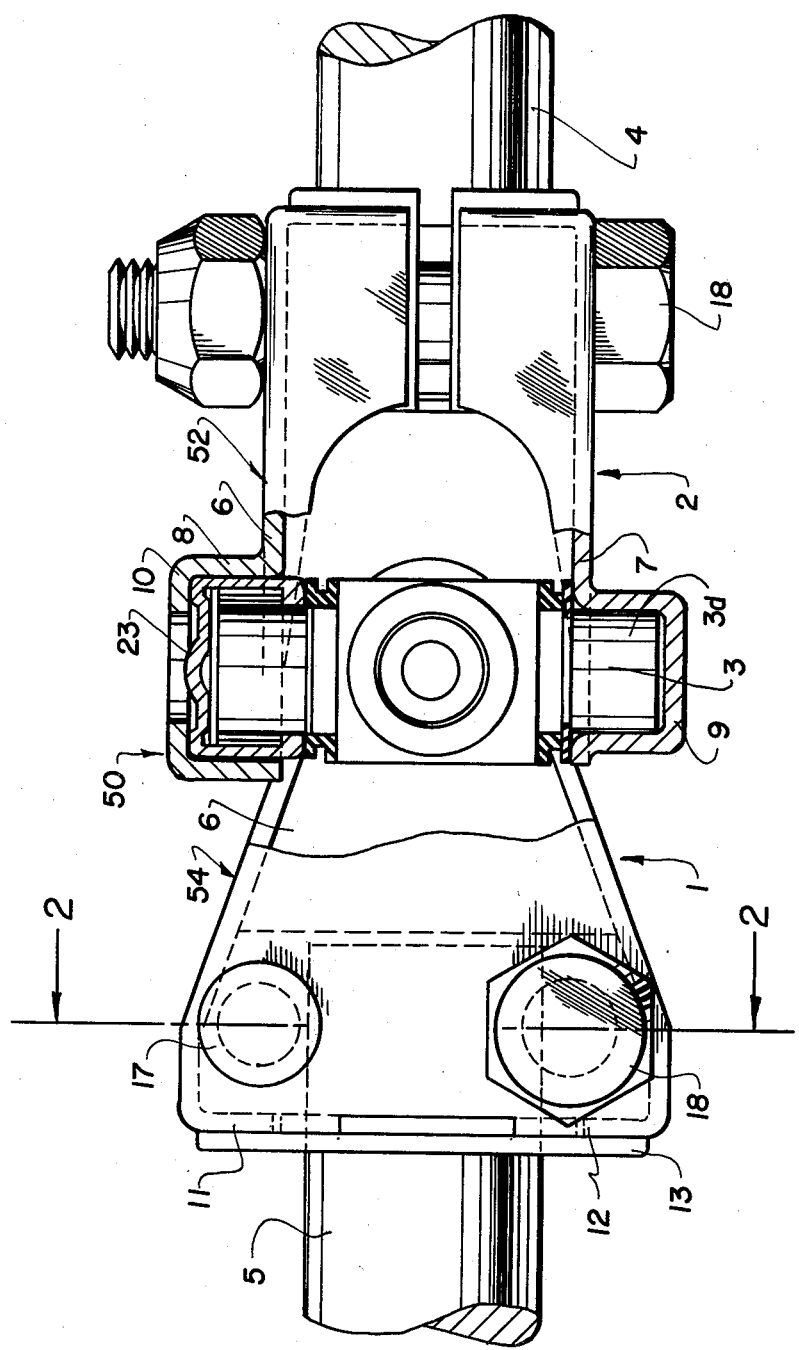
FIG. 1 is a top view of a universal joint part in section and constructed in accordance with the invention.
Figure 2:
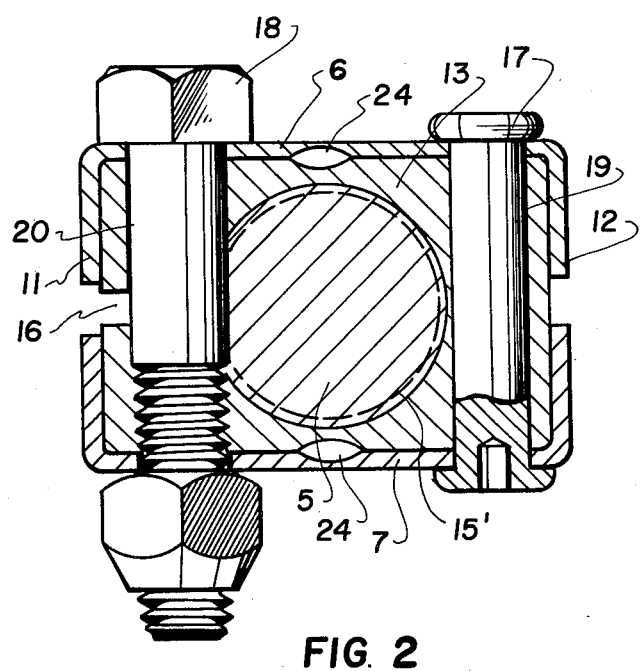
FIG. 2 is a section taken along the lines 2—2 of FIG. 1.

Referring to the drawings in particular, the invention embodied therein comprises a universal joint generally designated 50 which is made up of two fork assemblies 52 and 54. Each of the fork assemblies 52 and 54 comprises a fork half member 6 and 7, which has a cylindrical hub portion 9 or hat shaped seat 8 for rotatably supporting a respective pin 3a of a cross link member 3.

The universal joint shown in FIG. 1 comprises two joint forks 1 and 2, joined by a cross link 3 on the one hand and connected to a drive shaft 4 or driven shaft 5 on the other. The cross link 3 includes two sets of diametrically opposite 90° spaced apart rotation support pins 3d. Each joint fork is formed of two fork halves 6 and 7. The two fork halves are produced as deep-drawn stampings and are of U-shaped cross section, as evident from FIG. 5. Hat-shaped seats 8 and 9 formed into the stampings are provided at the respective fork half ends to seat the pins of the cross link 3. The design of the bearing seats may either be open with inwardly oriented supporting flange 10 for a needle bearing 23, as shown in the upper half of FIG. 1, or also closed, as shown in the lower half of FIG. 1.

The basic shape of the fork halves 6 and 7 is trapezoidal, widening from the bearing seat 8 towards the opposite fork end 6a and forming in this area the basis for the connection of the two fork halves. Provided at this fork end 6a are inwardly oriented, flangelike sections 11 and 12, forming integral parts of the fork halves.

A hub 13 with a revolving nut 14 is inserted in the flanges 11 and 12 and then clamped therein, and it serves to combine the two fork halves 6 and 7 into one joint fork. The connection makes possible the transmission of the tension and compression forces resulting from bending. Serving the purpose of an additional connection between the fork halves and the hub, and as additional safety, are a rivet 17 and a tightening screw 18 which penetrate the hub 13 and the fork halves 6 and 7 which have holes 19, 20 and cutouts 21, 22, respectively, for this purpose.

At the same time, the hub 13 serves as a connecting element to the drive shafts 4 and 5, respectively. The connection should be free of backlash and detachable, and for this purpose the hub 13 is provided on one side with a slot 16 which goes through to the hub bore 15 (FIGS. 6 and 7). The hub 13 can thus be clamped firmly to shaft 4 or 5. In addition, longitudinal teeth 15' are provided in the hub bore 15.

According to the special feature of the invention, the fork halves 6 and 7 are nitrided soft. This increases the fatique strength additionally, and excellent sliding properties are achieved for the bearing surfaces of the universal joint pins at the same time. It is thus possible to mount the bearing pins directly in the hat-shaped seats 9 (bottom half FIG. 1) so that an antifriction bearing as shown in the upper half of FIG. 1 can be obviated.

For the simplification and improvement of the assembly of the joint and its installation it is advantageous, after assembly of the cross link to join the fork halves to the respective hub first by spot welds 24 between the rivet and tightening screw holes, or by another suitable welding mode.

While specific embodiements of the invention have been shown and described in detail to illustrate the application of the principles of the invention, it will be understood that the invention may be embodied otherwise without departing from such principles.

What is claimed is:

1. A universal joint connectable between a driving and a driven shaft in particular for motor vehicle steering mechanisms, comprising a cross link member having two sets of diametrically opposite rorational support pins, first and second joint fork assemblies, each of said assemblies having two fork halves stamped out of thin metal sheet and including a first end with a cylindrical seat formed therein to seat a pin of the cross link and an opposite end engageable over a portion of the associated shaft along with another fork half portion which is connected with its respective opposite end over the remaining portion of said shaft, said fork halves being positively combined into one unit so as to be form fitting and being of U-shaped cross section, said forks being trapezoidal in a longitudinal directon of the fork halves from the first end to the second end thereof. Said second ends of said fork halves having bearing seats for the respective shafts with a flange oriented radially inwardly and including a hub portion disposed within the radially inwardly directed flange, engageable over the associated shaft and being clamped with said fork half portion to said shaft.

2. A universal joint according to claim 1, wherein said hub portion is of block shape with the outside surfaces fitting the fork halves.

3. A universal joint for interconnecting two rotational shafts, comprising a first fork assembly of first and second fork half members, each having a first end with a cylindrical hub portion and an opposite wider end having a bounding side wall flange, a first hub nut engageable over one of said shafts and disposed between said fork half members adjacent said wider end within said bounding side wall flanges, clamping means clamping said hub nut and said fork halves over the one of said shafts, a second fork assembly, third and fourth fork half members, each having a first end with a cylindrical hub portion and an opposite wider end having bounding side wall flanges, a hub nut engageable over one or the other of said shafts, and disposed between said fork half members adjacent said wider end, additional clamping means clamping said hub nut and said fork halves over the other of said shafts, a cross link having a first set of diametrically opposite rotation axis pins rotatably supported in respective cylindrical hub portions of said first and second fork half members, and having a second set of rotation axis pins rotatably supported in respective cylindrical hub portions of said third and fourth fork half members.

4. A universal joint according to claim 3, wherein said hub member includes a bore therethrough for a tightening screw, a tightening screw extending through respective pairs of said first and second and third and fourth fork half members and the associated nut member therebetween, said hub member being slotted perpendicular to the tightening screw bore.

5. A universal joint according to claim 3, wherein said first and second and third and fourth fork members and the associated hub nut therebetween include a bore therethrough for a rivet on one side of said shaft and a bore therethrough for a clamping screw, a rivet extending through the rivet bore and a clamping crew extending through the clamping bore.

6. A universal joint according to claim 5, wherein said fork halves are welded to the hub nut between the rivet and screw connection.

7. A universal joint according to claim 3, wherein said fork halves are nitrited soft, said cross link pins being rotatable in the cylindrical hub portions without bearings.

8. A universal joint according to claim 3, wherein said first and second nuts have a radially extending slot permitting the portions of said hub nut bounding said shaft to be tightened around said shaft to permit it to be inserted in said fork flange.

9. A universal joint according to claim 8, including a rivet connected between respective first and second and third and fourth half members and through the associated hub nut therebetween.

* * * * *